US012480354B2

(12) United States Patent
Gordon

(10) Patent No.: US 12,480,354 B2
(45) Date of Patent: *Nov. 25, 2025

(54) MOUNTING HARDWARE ASSEMBLY

(71) Applicant: Randy Gordon, Hesperia, MI (US)

(72) Inventor: Randy Gordon, Hesperia, MI (US)

( * ) Notice: Subject to any disclaimer, the term of this patent is extended or adjusted under 35 U.S.C. 154(b) by 217 days.

This patent is subject to a terminal disclaimer.

(21) Appl. No.: 18/217,125

(22) Filed: Jun. 30, 2023

(65) Prior Publication Data

US 2023/0349224 A1 Nov. 2, 2023

Related U.S. Application Data

(63) Continuation-in-part of application No. 16/861,775, filed on Apr. 29, 2020, now Pat. No. 11,732,524.

(60) Provisional application No. 62/841,122, filed on Apr. 30, 2019.

(51) Int. Cl.
*E06B 1/60* (2006.01)

(52) U.S. Cl.
CPC .................................. *E06B 1/6015* (2013.01)

(58) Field of Classification Search
CPC ... E04B 1/40; E06B 1/60; F16M 13/00; E04F 21/0015
USPC .................................... 52/213; 248/547, 300
See application file for complete search history.

(56) References Cited

U.S. PATENT DOCUMENTS

| | | | |
|---|---|---|---|
| 1,348,721 | A | 8/1920 | Ketteringham, Jr. |
| 1,621,213 | A | 3/1927 | Olson |
| 3,226,781 | A | 1/1966 | Schnabel |
| 3,430,385 | A | 3/1969 | Biro |
| 3,490,797 | A | 1/1970 | Platte |
| 4,014,146 | A | 3/1977 | Dimascio et al. |
| 4,148,454 | A | 4/1979 | Carlson et al. |
| 4,283,034 | A | 8/1981 | Sheehan |
| 4,718,195 | A | 1/1988 | Ortega |
| 4,840,002 | A | 6/1989 | Lovgren |
| 4,986,044 | A | 1/1991 | Funari |
| 5,119,609 | A | 6/1992 | Tait et al. |
| 5,167,073 | A | 12/1992 | Stein |
| 5,577,700 | A | 11/1996 | Williams, Jr. |
| 5,655,342 | A | 8/1997 | Guillemet et al. |
| 5,692,350 | A | 12/1997 | Murphy, Jr. |
| 5,771,644 | A | 6/1998 | Kidd |
| 5,890,297 | A | 4/1999 | Frasheski |
| 6,131,361 | A | 10/2000 | Murphy |
| 6,178,717 | B1 | 1/2001 | Loop |

(Continued)

FOREIGN PATENT DOCUMENTS

| | | | |
|---|---|---|---|
| EP | 1396602 | A1 | 3/2004 |

*Primary Examiner* — Paola Agudelo
(74) *Attorney, Agent, or Firm* — Dority & Manning, P.A.

(57) ABSTRACT

A mounting hardware assembly is provided herein that includes a bracket having first and second sections. The first and second sections are coupled to one another by a weakened portion. A jamb flange and a wall flange are each defined by the first section. The wall flange is perpendicularly offset from the jamb flange at a common edge. First and second flange apertures are defined by the jamb flange. An elongated body is defined by the second section. A support flange extends at least partially along the elongated body. The support flange is offset from the elongated body. A plurality of openings are defined by the elongated body. The plurality openings includes at least first and second openings. The first opening and the first flange aperture at least partially align when the second opening and the second flange aperture are at least partially aligned.

20 Claims, 18 Drawing Sheets

(56) References Cited

U.S. PATENT DOCUMENTS

| | | | |
|---|---|---|---|
| 6,286,274 | B1 | 9/2001 | Mckann |
| 6,293,061 | B1 | 9/2001 | Horak, Jr. |
| 7,396,055 | B2 | 7/2008 | Arneson |
| 7,716,886 | B2 | 5/2010 | Gordon |
| 7,882,662 | B2 | 2/2011 | Root et al. |
| 8,333,359 | B2 | 12/2012 | Gordon |
| 9,476,194 | B1 | 10/2016 | Hulka |
| 10,794,069 | B2 | 10/2020 | Gill |
| 2001/0010167 | A1 | 8/2001 | Leek |
| 2004/0060241 | A1 | 4/2004 | Staples |
| 2008/0054137 | A1 | 3/2008 | Poulin |
| 2008/0222980 | A1 | 9/2008 | Root et al. |
| 2009/0077910 | A1 | 3/2009 | Gordon |
| 2011/0024591 | A1 | 2/2011 | Gordon |
| 2015/0184381 | A1 | 7/2015 | Coyle |
| 2015/0308098 | A1 | 10/2015 | Tessadori |

MOUNTING HARDWARE ASSEMBLY

CROSS-REFERENCE TO RELATED APPLICATION

This application claims priority to U.S. patent application Ser. No. 16/861,775, entitled "MOUNTING HARDWARE ASSEMBLY," filed on Apr. 29, 2020, which claims priority to U.S. Provisional Patent Application No. 62/841,122, entitled "MOUNTING HARDWARE ASSEMBLY," filed on Apr. 30, 2019. The entire contents of the above-referenced applications are hereby incorporated by reference in its entirety for all purposes.

FIELD OF THE INVENTION

The present disclosure generally relates to a mounting hardware assembly that can be used for mounting various objects to proximately disposed structures.

BACKGROUND OF THE INVENTION

Various types of mounting systems are used to mount objects within a building structure. It is desired to design a mounting hardware assembly that can be used for various applications.

SUMMARY OF THE INVENTION

According to some aspects of the present disclosure, a mounting hardware assembly is disclosed. The mounting hardware assembly includes a bracket having first and second sections coupled to one another by a weakened portion. A jamb flange and a wall flange are each defined by the first section. The wall flange extends perpendicularly from the jamb flange at a common edge First and second flange apertures are defined by the jamb flange. An elongated body is defined by the second section. A support flange extends at least partially along the elongated body. The support flange is offset from the elongated body. A plurality of openings is defined by the elongated body. The plurality openings include first and second openings. The first opening and the first flange aperture at least partially align when the second opening and the second flange aperture are at least partially aligned.

According to some aspects of the present disclosure, a mounting hardware assembly is disclosed that includes a bracket having first and second sections. A jamb flange and a wall flange are each defined by the first section. An elongated body is defined by the second section. A support flange is offset from the elongated body. The support flange extends less than the full length of the elongated body.

According to some aspects of the present disclosure, a mounting hardware assembly is disclosed that includes a bracket defining a jamb flange and a wall flange. Each of the jamb flange and wall flange can be configured to extend outwardly of a door frame. A plurality of fastener openings can be defined by the bracket and positioned along a common axis. The plurality of fastener openings can include a generally centrally-located opening. A support flange can extend at least partially along the bracket.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
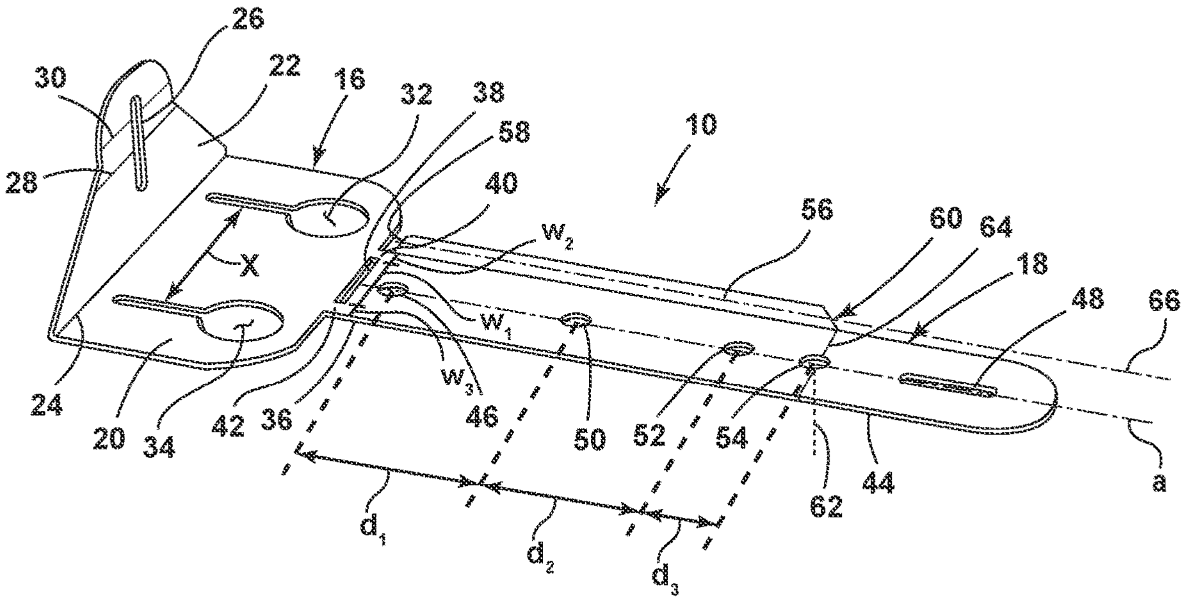
FIG. 1 is a top isometric view of a bracket of a mounting hardware assembly, according to some examples.

For purposes of description herein, the terms "upper," "lower," "right," "left," "rear," "front," "vertical," "horizontal," and derivatives thereof shall relate to the embodiment of the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if any assembly or composition is described as containing components A, B, and/or C, the assembly or composition can contain A alone; B alone; C alone; A and B in combination; A and C in combination; B and C in combination; or A, B, and C in combination.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a twenty percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Conventional methods for installing a door jamb, window jamb, or the like to a building wall have generally involved positioning the jamb in a rough opening and filling the gaps between framing members of the rough opening and the jamb with shims. Properly trimming and installing the shims between the jamb and the frame defining the opening requires a considerable amount of time, skill, and effort to properly fit the jamb in the opening so that the jamb is plumb. After the shims have been properly positioned, nails are driven through the jamb and the shims into the supporting framing members defining the opening. Thereafter, protruding pieces of the shims, if any, are cut flush with the edge of the jamb.

The following disclosure describes a mounting hardware assembly that includes one or more brackets. In some embodiments, the one or more brackets can include a bracket having first and second sections. The first and second sections are coupled to one another by a weakened portion. A jamb flange and a wall flange are each defined by the first section. The wall flange is perpendicularly offset from the jamb flange at a common edge. First and second flange apertures are defined by the jamb flange. An elongated body is defined by the second section. A support flange extends at least partially along the elongated body. The support flange is offset from the elongated body. A plurality of openings are defined by the elongated body. The plurality openings including first and second openings. The first opening and the first flange aperture at least partially align when the second opening and the second flange aperture are at least partially aligned. Embodiments of the mounting hardware assembly described herein can be used during the installation of many different types of doors. Examples include hinged doors, pre-hung door assemblies, interior doors, exterior doors, doors with side lights, hinged patio doors, knockdown doors, and split jamb pre-hung door assemblies, among others.

Embodiments of the mounting hardware assembly may reduce the number of fasteners and/or brackets needed for jamb installation. The mounting hardware assembly may also produce a less expensive mounting bracket. In addition, the mounting hardware assembly provided herein may be at least partially pre-installed on the jamb prior to shipment from the factory. The mounting hardware assembly may be used for various installation processes increasing the versatility of the assembly provided herein. For example, the bracket may be used in a first installation process wherein first and second sections of the bracket are maintained in an integral, attached condition. In addition, a second installation process in which the bracket may include separating the first and second sections of the bracket. In some mounting operations, a common pre-hung door assembly may include some brackets that utilize the first installation process while other brackets can utilize the second installation process. The bracket may be formed of a bendable sheet material, such as an anodized or other corrosion resistant metallic material, that may be processed through various manufacturing processes, such as punching and bending.

Figure 2:
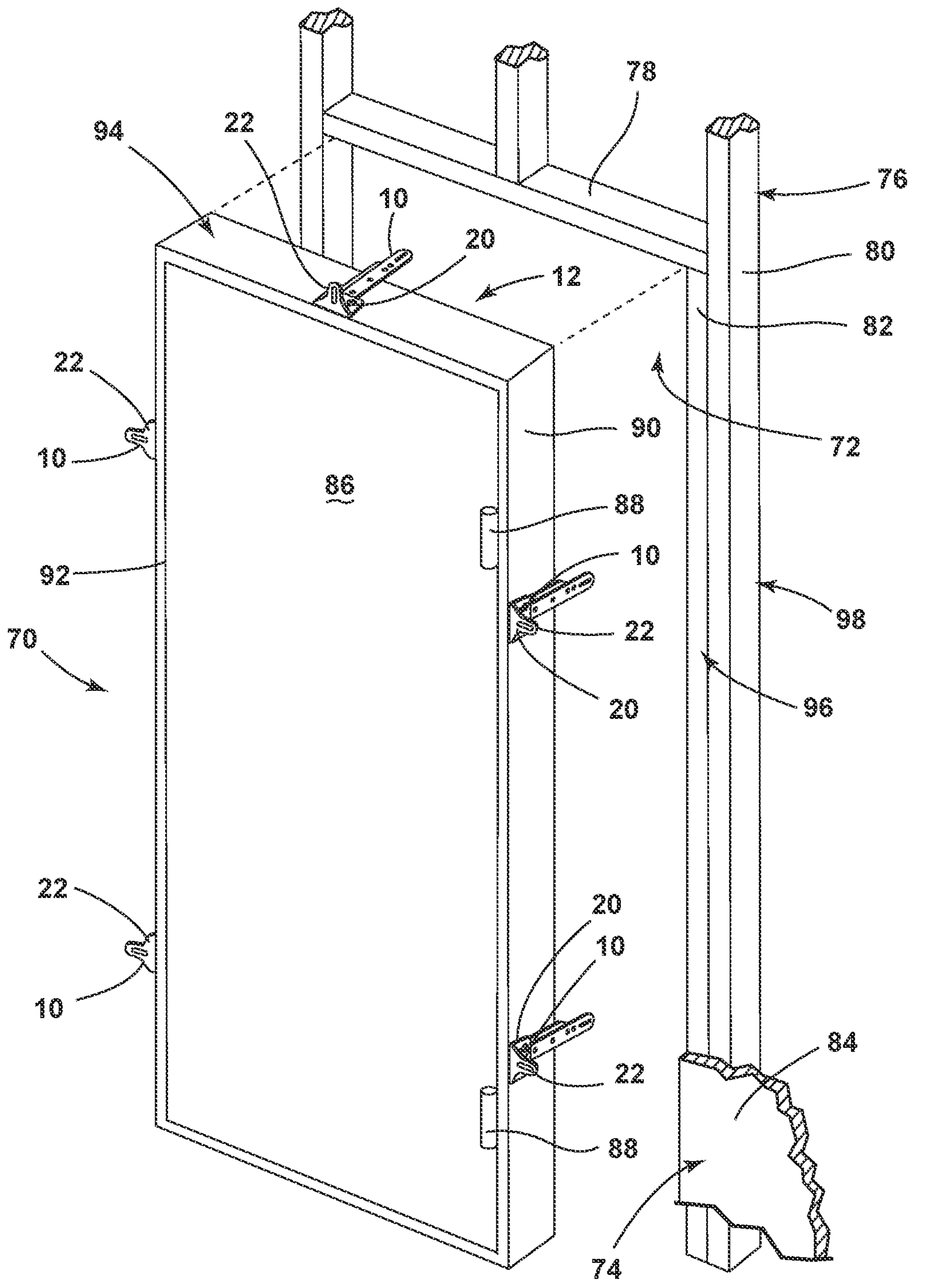
FIG. 2 is a front isometric view of a mounting assembly, with the bracket of FIG. 1, coupled to a pre-hung door assembly proximate to a rough opening of a building, according to some examples.
Figure 3:
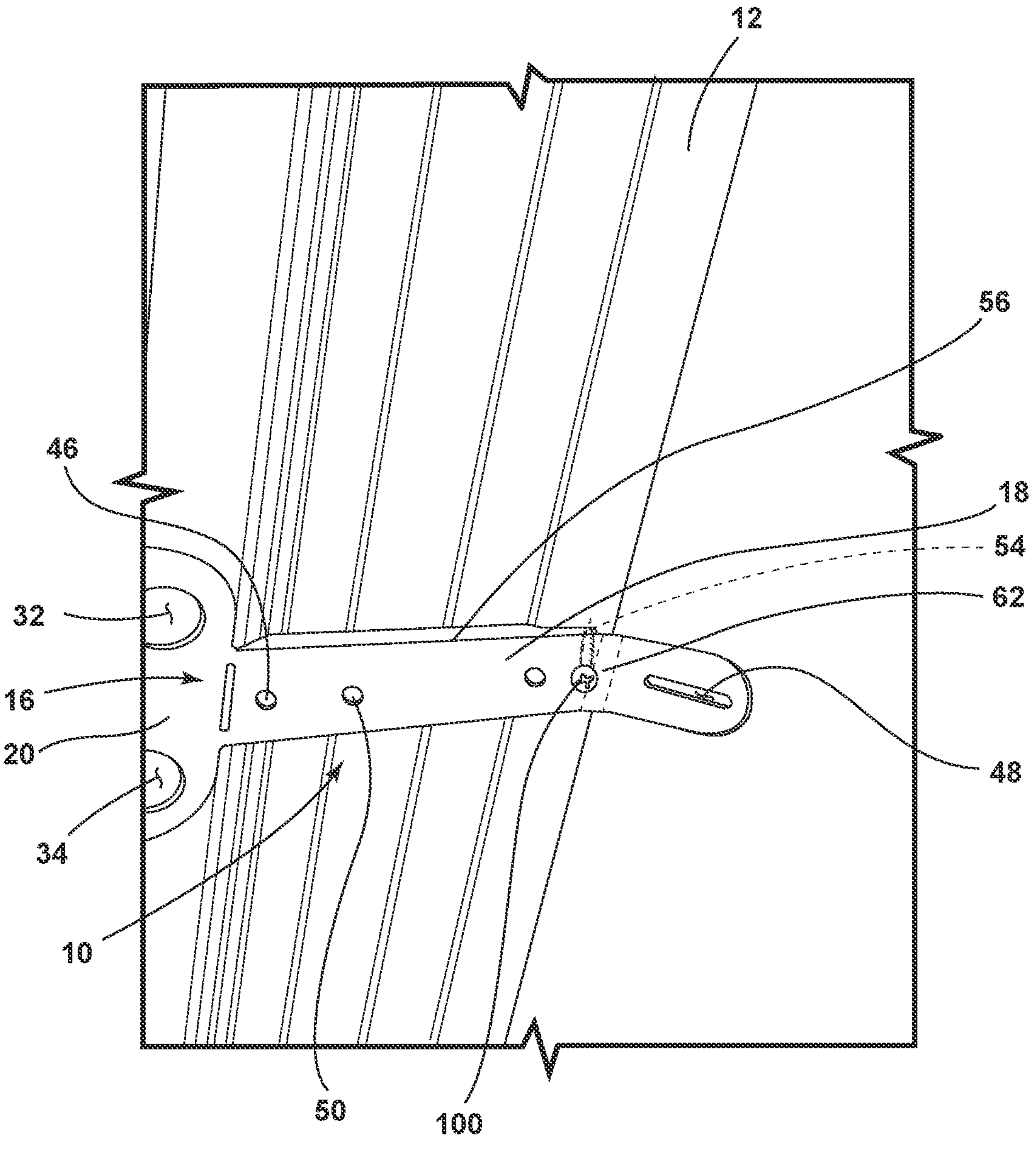
FIG. 3 is a front isometric view of the bracket of FIG. 1 having first and second sections attached to one another and coupled to a door jamb of the pre-hung door assembly, according to some examples.
Figure 5:
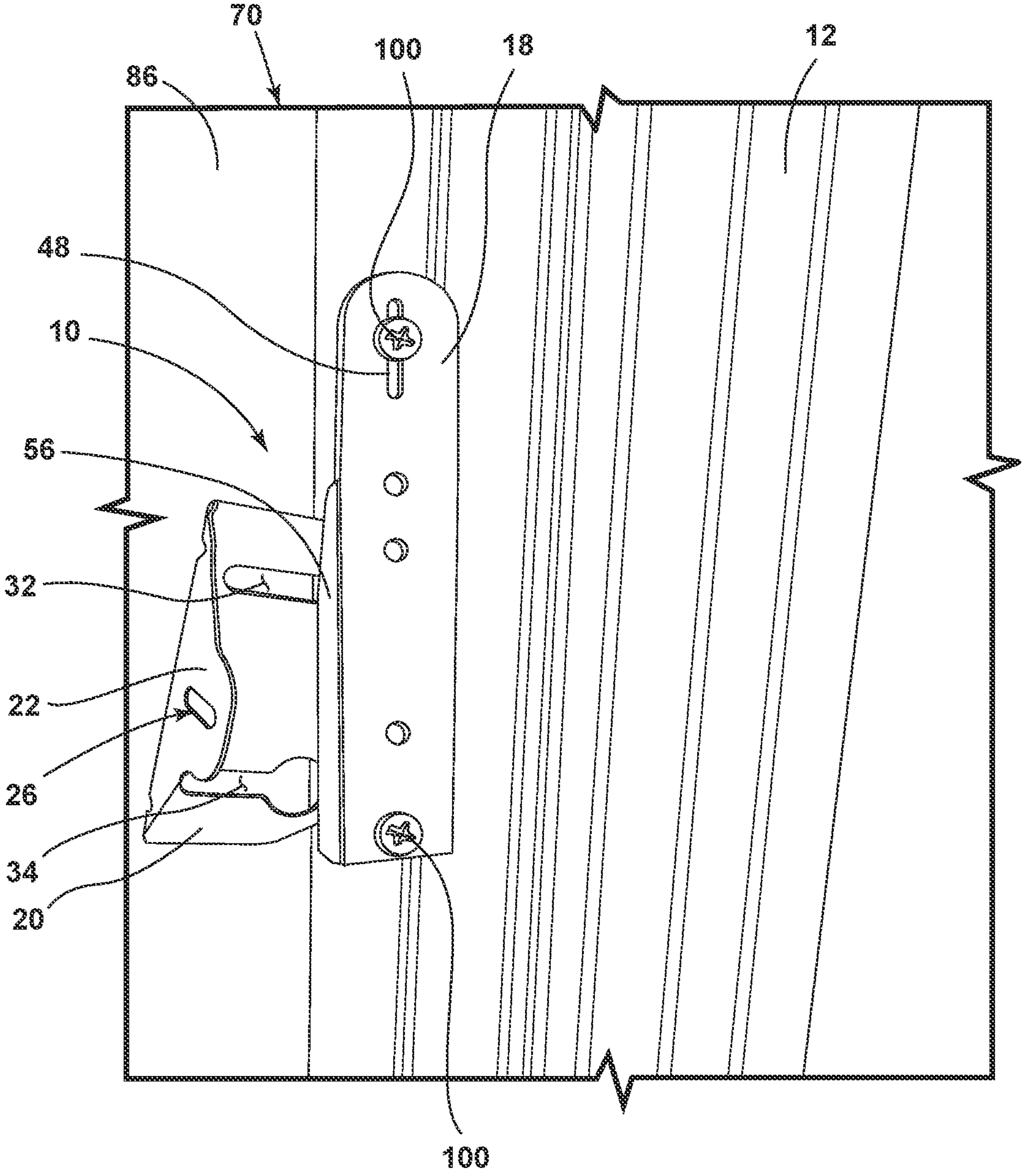
FIG. 5 is a front isometric view of the second section of the bracket of FIG. 1 coupled to the door jamb and a jamb portion of the first section partially positioned between the door jamb and the second section, according to some examples.
Figure 6:
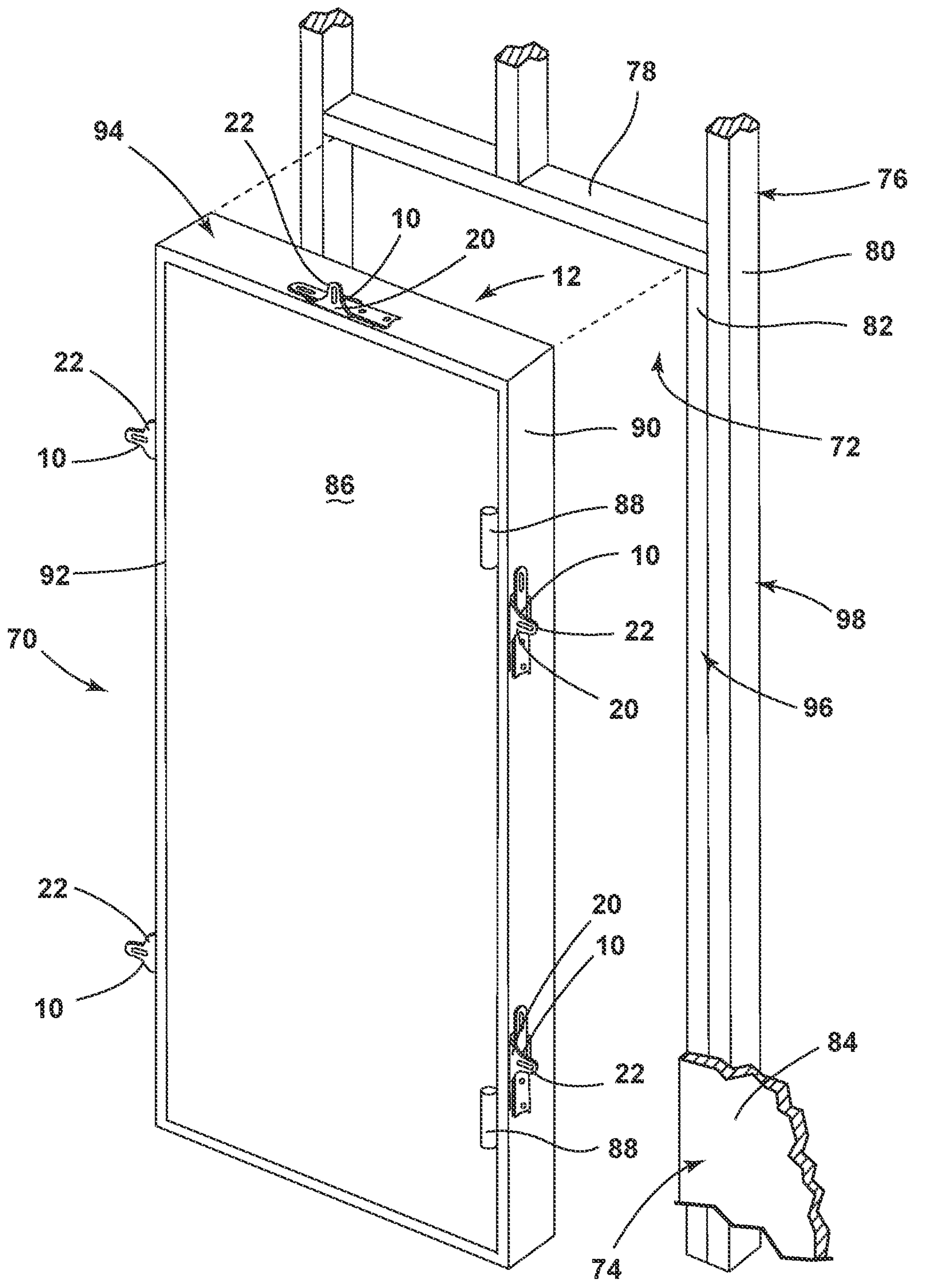
FIG. 6 is a front isometric view of the mounting assembly of FIG. 1 coupled to a pre-hung door assembly proximate to a rough opening of a building, according to some examples.

The mounting hardware assembly may be initially attached to the object or the support structure prior to alignment between the object and the support structure. The mounting hardware assembly may be used for generally any type of building fenestration, including doors, windows, skylights and the like. In general, such fenestrations may be provided in various building panel structures, including exterior and interior wall structures, and roof structures. In some embodiments, one of which is illustrated in FIGS. 1-3, the mounting hardware assembly may be in the form of a bracket 10 that may be configured to couple with an outboard side of a door frame 12 and an adjacent structure 14, such as a wall. The bracket 10 includes first and second sections 16, 18 that are integrally formed with one another, or later attached to one another. In some installation processes, the first and second sections 16, 18 are maintained in an attached condition, as illustrated in FIGS. 1-3. In other installation processes, such as the example illustrated in FIGS. 4-6, the first and second sections 16, 18 may be separated from each other and installed individually.

As illustrated in FIGS. 1-3, the first section 16 of the bracket 10 includes a jamb flange 20 that is configured to be attached to a door frame 12. The first section 16 also includes a wall flange 22 that extends perpendicularly from the jamb flange 20 forming a common edge 24 between the two flanges 20, 22. In some examples, such as the embodiment illustrated in FIGS. 1-3, the jamb flange 20 and the wall flange 22 form a right angle at the edge 24 relative to one another.

The wall flange 22 can define a fastener void 26, which may be in the form of a slot that extends perpendicularly to the common edge 24. A fastener can be disposed through the fastener void 26 to operably couple the wall flange 22 to the adjacently disposed wall. The fastener void 26 may allow for variances and tolerance differences in various installations. In some embodiments, the wall flange can define various other fastener voids in addition to or in lieu of the slot. For example, the wall flange may have any number of fastener voids that are circular or any of any other geometric shape.

To assist in or aligning (e.g., plumbing) the bracket 10, the bracket 10 may include various alignment features. For example, one or more positioning lines or indicators 28, 30 extends perpendicularly to the fastener void 26 at spaced locations on the wall flange 22 to facilitate aligning the flanges with a plumb line that can be drawn on the wall, which according to some examples, may be about one-half inch from the rough opening.

The jamb flange of the bracket can define one or more apertures through which a fastener may be positioned and inserted within the door frame. For example, as illustrated in FIG. 1, the jamb flange 20 defines a pair of apertures 32, 34. In some instances, the apertures 32, 34 may extend from a narrow portion 58 adjacent the edge 24 to an enlarged portion 60 at the end of each aperture 32, 34 further from the common edge 24. In embodiments in which the apertures 32, 34 are non-circular, the apertures 32, 34 may be parallel to one another, as illustrated in FIG. 1, or non-parallel (e.g., offset) relative to one another. In embodiments in which the apertures 32, 34 are parallel to one another, such as the example of FIG. 1, the apertures 32, 34 may be separated from one another by a distance x. In various embodiments, the jamb flange may include any number of apertures or voids of any geometrical shape through which one or more fasteners is inserted.

The second section of the bracket may be coupled to an edge portion of the jamb flange that is opposite the common edge. The first and second sections of the bracket may be coupled by a weakened portion through a living hinge, perforations therebetween, or otherwise weakened, such that the first section of the bracket may be separated from the second section of the bracket when desired. In some instances, the weakened portion allows for detachment of the second section from the first portion without the need of any additional tools. However, the attachment portion may provide enough rigidity such that inadvertent detachment of the first and second sections from one another is minimized. For example, as illustrated in FIG. 1, a weakened portion 36 includes a rectangular notch 38 that is defined between the first and second sections 16, 18 of the bracket 10. A pair of attachment legs 40, 42 extends between the first and second sections 16, 18 on each side of the notch 38. The notch 38 has a width $w_1$ along the edge that is greater than a width $w_2$, $w_3$ of each of the legs 40, 42. In various embodiments, any number of notches 38 may be defined between the first and second sections 16, 18 of the bracket 10 that are separated by any number of attachment legs 40, 42.

The second section of the bracket can be defined by an elongated body having variously sized and shaped openings disposed along the elongated body that may be utilized for various installation processes of the bracket. For example, as illustrated in FIG. 1, a first fastener opening 46 is defined proximately to the notch 38 separating the first and second sections 16, 18. A slot 48 is defined proximately to an opposing end portion of the elongated body 44. The slot 48 extends along a common axis as the elongated body 44 and can have a substantially continuous, or varied, width.

One or more intermediate openings may be defined between the first fastener opening and the slot. For example, a second fastener opening 50 may be defined by the elongated body 44 that is separated from the first fastener opening 46 by a first distance $d_1$. Second faster opening—generally centrally located. A third fastener opening 52 may be positioned on an opposing side of the second fastener opening 50 from the first fastener opening 46. The third fastener opening 52 may be separated from the second fastener opening 50 by a second distance $d_2$. A fourth fastener opening 54 is disposed between the third fastener opening 52 and the slot 48. The fourth fastener opening 54 is separated from the third fastener opening 52 by a third distance $d_3$. In some embodiments, such as the example illustrated in FIG. 1, the second distance $d_2$ may be equal to the distance x separating first and second apertures 32, 34 on the jamb flange 20. Accordingly, in some embodiments, such as the example illustrated in FIG. 1, the second fastener opening 50 and the first flange aperture 32 at least partially align when the third opening 52 and the second flange aperture 34 are at least partially aligned.

Figure 4:
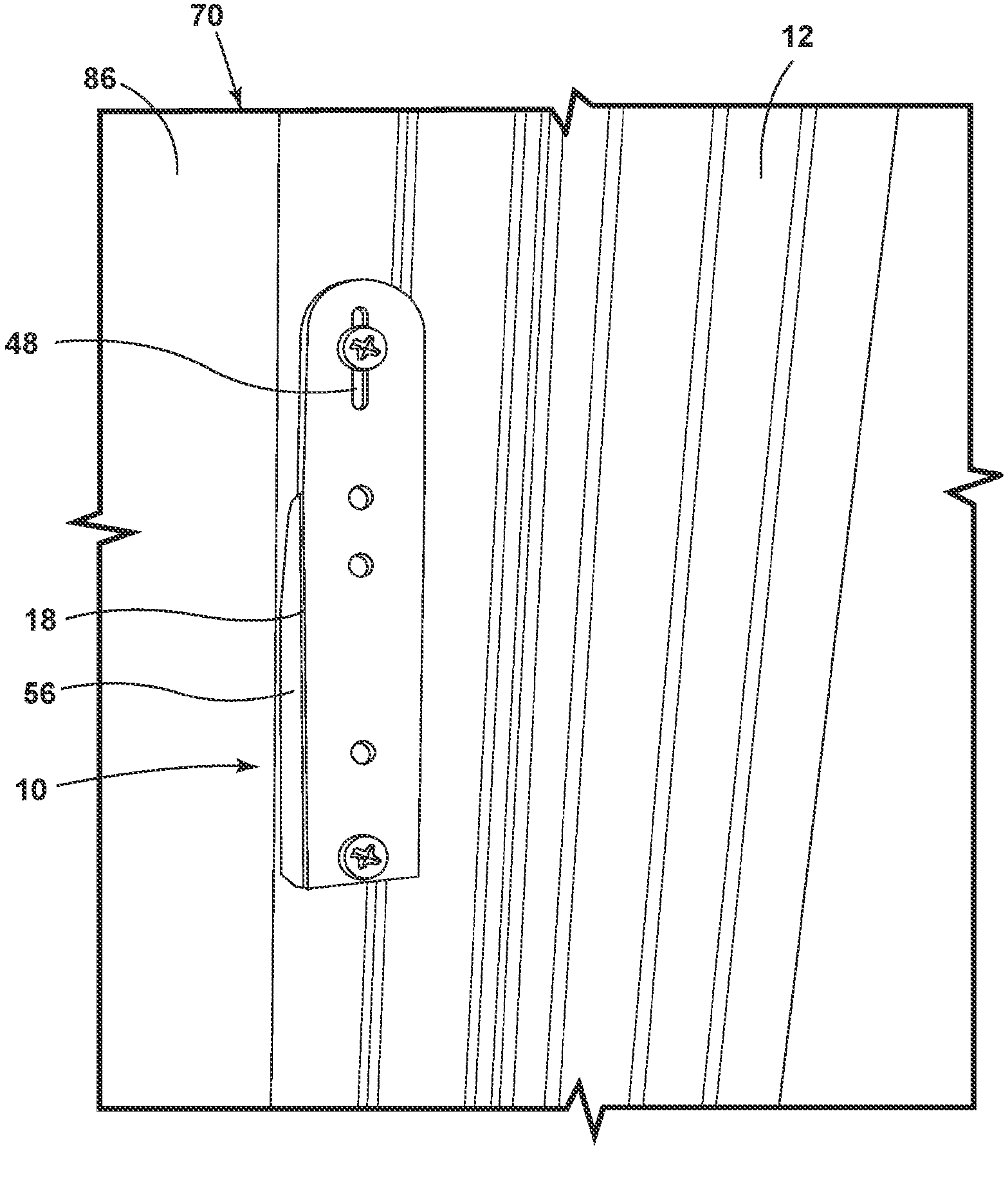
FIG. 4 is a front isometric view of the second section of the bracket of FIG. 1 coupled to the doorjamb, according to some examples.

A support flange may extend at least partially along the elongated body, which may extend in an offset direction from the second section of the bracket. The flange may be configured to add additional rigidity or strength to the second section of the bracket. For example, as illustrated in FIG. 4, the second section 18 of the bracket 10 may extend along a first extension axis 66. A support flange 56 may extend along a second extension axis 68 that is parallel to the first extension axis 66. A first end portion 58 of the support flange 56 terminates proximately to the attachment legs 40, 42. A second end portion 60 of the support flange 56 may terminate proximate to a bend region 62 of the second section 18.

In some installation processes, the second section 18 of the bracket 10 is detached from the first section 16 by rotating the second section 18 relative to the first section 16. During rotation of the two sections 16, 18 relative one another, the first end portion 58 of the support flange 56 assists in retaining a substantially linear orientation of the second section 18 while the attachment legs 40, 42 are bent, or otherwise weakened through deformation, until the attachment legs 40, 42 are broken. Likewise, the second end portion 60 of the support flange 56 assists in defining the bend region 62 while the second section 18 is bent around an opposing side of the wall from the wall flange 22. Thus, the support flange 56 extends less than the full length of the elongated body 44 and defines a segment that has a higher resistance to bending than the remaining segments of the second section 18. In various embodiments, other strengthen features may additionally or alternatively be used, such as forming hemmed/wire edges, forming structural grooved seams along portions of the second section 18, forming flared/beaded punched holes, or stretching the profile of the bracket 10 along various segments of the second section 18 of the bracket 10.

In some embodiments, an indicator may be provided on the second section 18 that illustrates a proximate position of the bend region 62. For example, as illustrated in FIG. 1, a score line 64 may be provided on the elongated body 44. The score line 64 may be perpendicular to the extension axis of the support flange 56. In some embodiments, the bend region 62, and hence the score line 64, may intersect one or more openings 46, 48, 50, 52, 54 defined by the elongate body 44.

Embodiments of the bracket may be installed in an attached installation process in which the first and second sections and connected to one another or a separated installation in which the first and second sections are separated from one another. The attached installation process can be used when installing an interior door. For example, as shown in FIGS. 2 and 3, a pre-hung door assembly 70 is illustrated in position to be mounted in a door opening 72 in a building wall 74, wherein the door opening 72 is surrounded by various wall frame members 76, which can include a header 78 at the top of the door opening 72 and vertical members or studs 80 disposed on opposing sides of the door opening 72. The frame members 76 may further include liner members 82. The wall frame members 76 may be covered with drywall 84 or any other covering material.

In the example illustrated in FIGS. 2 and 3, the pre-hung door assembly 70 includes a door 86 mounted to a door frame 12 by hinges 88 on a hinge side 90 of the door frame 12 and the door 86. The opposite side of the door frame 12 and the door 86 may be configured as a latch side 92. The prefabricated door frame 12 also includes a header member 94 extending across the upper ends of the side members. The door 86 may be preassembled in the frame 28, and the door 86 and jamb assembly 10 may be mounted as a unit in the door opening 72 defined by the wall frame member 76.

In various mounting procedures, such as when the door is to be installed within the interior of a building, the bracket may be used to secure the pre-hung door assembly to two opposing sides of the wall. The attachment of the bracket to opposing sides of the wall or opening may produce increased rigidity in the mounting of the door. As illustrated in FIGS. 2 and 3, in some mounting procedures, the first and second sections 16, 18 of the bracket 10 may be connected to one another. While connected, the first section 16 overlaps a first side 96 of the wall 74 and the second section 18 of the bracket 10 may extend beyond an opposing, second side 98 of the wall 74. The portion of the second section 18 that extends beyond the second side 98 of the wall 74 may be bent away from the door jamb within the bend region 62 (see FIG. 3). Various fasteners such as screws, bolts, nails and the like, may be disposed through the wall flange 22 and the bent portion of the second section 18 to retain the pre-hung door assembly 70 in a substantially constant position relative to the surrounding structure 14.

The mounting hardware assembly may be used with either new construction or during remodeling/renovation. In addition, the mounting hardware assembly may also be used with or without a finish material (e.g., drywall) applied to the studs. Due to the variously positioned fastener openings defined by the second section, the bracket can be self-adjusting to various wall thicknesses based on the presence or lack of a finish material applied to the studs, among other factors. For example, as illustrated in FIG. 2, a wall covering material may be disposed on a first side 96 of a stud 80 and the opposing, second side 98 of the stud 80 may be unfinished or free of a wall covering material. In such instances, a fastener may be positioned within the fourth fastener opening 54 (see FIG. 1). In examples in which both sides of the stud 80 have a covering material, the fastener may be positioned within the third fastener opening 52 allowing the slot 48 to extend further from the jamb to account for the additional thickness of the stud 80 and wall covering combination. In some embodiments, the third distance $d_3$ may be substantially equal to that of commonly used wall coverings, such as drywall 84. For example, the third distance $d_3$ may be substantially equal to 0.5 inches. However, the third distance $d_3$ may be any other distance for various installations using a wall covering having a thickness that is varied from 0.5 inches. Accordingly, the spacing of the holes 46, 50, 52, 54 allows mounting regardless of whether a wall is or isn't covered.

In operation, a fastener 100 may be positioned through one of the fastener openings 46, 48, 50, 52, 54 on the second section 18, such as the fourth opening 54, as illustrated in FIG. 3. Once the fastener 100 operably couples the second section 18 of the bracket 10 to the door jamb, the bracket 10 may be plumbed or placed in a desired orientation. Once the bracket 10 is positioned in a desired orientation, additional fasteners 100 may be positioned through the jamb flange 20 or the second section 18 of the bracket 10. The door 86 may be aligned with the rough opening and an additional fastener 100 may be inserted through the fastener void 26 of the wall flange 22 and into the wall structure 14. Then, a portion of the second section 18 that extends beyond the stud 80 may be bent away from the jamb of the door 86. An additional fastener 100 may be positioned through the slot 48 of the second section 18 thereby attaching the second section 18 of the bracket 10 to the stud 80 on an opposing side of the wall structure 14 from the wall flange 22. After the pre-hung door assembly 70 is attached to the rough opening, the pre-hung door assembly 70 can be framed with molding or the like that attaches to the walls 14 and covers the mounting hardware assembly to provide a desired appearance.

In some installation processes, such as, for example, when fixing an exterior pre-hung door assembly to a rough opening, the second section of the bracket may be separated from the first section of the bracket and the second section can be initially attached to the door frame. In some embodiments, opposing end portions of the second section can be attached to the door frame. A central portion of the second section between the attached opposing end portions may be capable of flexing away from the door frame or otherwise separated from the door frame to form a space between the second section and the door frame. The jamb portion of the bracket may then be placed within the space formed between the door frame and the second section to provide a simple, fast, or effective way to secure jambs to building panel structures such as wall structures and roof structures. In some embodiments, such as the example illustrated in FIGS. 4-6, a second section 18 of the bracket 10 is separated from the first section 16 at the weakened portion 36. The second section 18 is attached to the door frame 12 through one or more fasteners 100. A central portion of the second section 18 may be separable from the door frame 12 thereby defining a space between the door frame 12 and the second section 18.

The jamb flange of the first section is inserted into the space defined between the door frame and the second section and additional fasteners are inserted through various fastener openings of the second section and apertures of the jamb flange. For example, fasteners 100 may be inserted through the second and third fastener openings 50, 52 of the second section 18 and through the pair of apertures 32, 34 on the jamb flange 20 of the first section 16. The pre-hung door assembly 70 may then be aligned with the rough opening and an additional fastener 100 may be disposed through the fastener void 26 of the wall flange 22. After the second section is attached to the pre-hung door assembly and the first section is attached to the door frame and the wall, some additional steps may be taken for installing an exterior door that include, for example, flashing and weatherizing the opening according to the requirements of the door manufacturer. Such an installation process may provide additional strength and rigidity to the mounting of the door frame.

Figure 7:
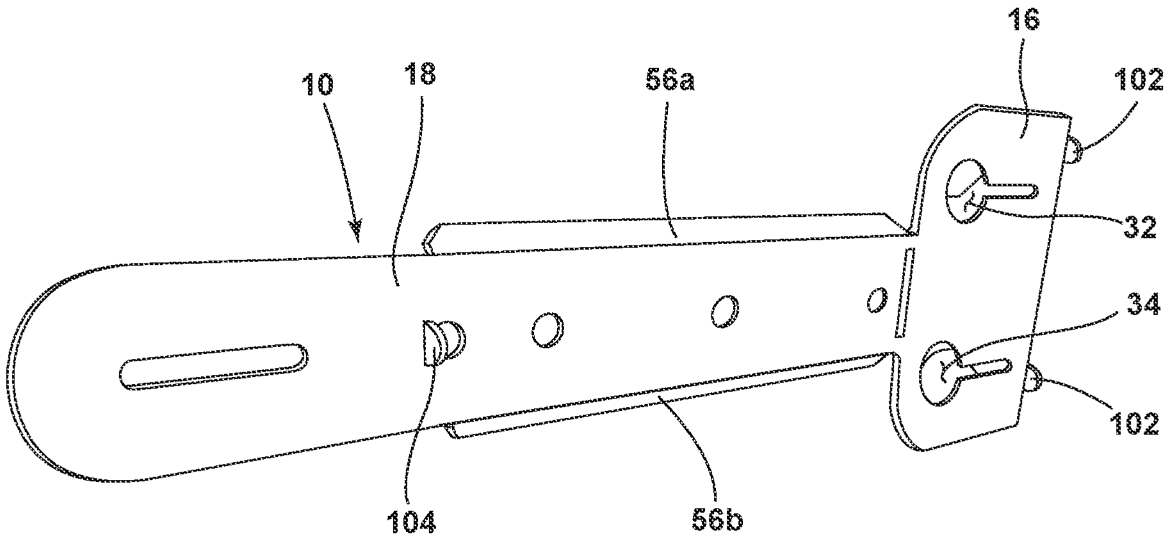
FIG. 7 is a bottom isometric view of the bracket having positioning stops extending from the first section of the bracket and a retaining projection extending from the second section of the bracket, according to some examples.

The bracket may also include retaining features that allow for the bracket to be maintained on the door jamb. For example, as illustrated in FIG. 7, the first section 16 of the bracket 10 can include positioning stops 102 that extend perpendicularly from the jamb flange 20 proximate to the common edge 24. The stops 80 may engage the perimeter of the frame 28 as the jamb flange 20 is slid inwardly on the frame 28, positioning the edge 24 at the perimeter of the frame 28, which positions the perimeter of the door frame 12 at the surface of the wall 74.

In addition, a retaining projection 104 may extend perpendicularly from the second section 18 of the bracket 10 and in a substantially parallel direction relative to the positioning stops 102. The retaining projection 104 may be separated from the positioning stops 102 at a distance that is substantially equal to the thickness of a door frame 12. For example, the distance between the retaining projection 104 and the positioning stops 102 may be 4.5625 inches, 5.25 inches, 6.625 inches, or any other distance.

The retaining projection 104 may include a score line along a base thereof. Accordingly, in installations in which the second section 18 of the bracket 10 is separated from the first section 16, the retaining projection 104 may be removed from the second section 18. Removal of the retaining projection 104 may be assisted by the score line and allow the second section 18 of the bracket 10 to lay flatly along the door frame 12. In some examples, the retaining projection 104 may have a pointed tip that may be inserted into the door frame 12 by placing pressure on the opposing side of the second section 18. By inserting the retaining projection into the door frame, the bracket may be maintained on the door frame or removal of the projection when completing a separated installation may not be needed.

To further increase the rigidity of the second section, or portions thereof, the second section may include a pair of support flanges that extend from opposing sides of the second section. For example, as illustrated in FIG. 7, a pair of support flanges 56*a*, 56*b* may extend along opposing sides of the second section 18 of the bracket 10. Each of the support flanges 56*a*, 56*b* may be offset from the elongated body 44 of the second section 18 by a common angle. Or, one of the support flanges (e.g., 56*a*) may be offset from the elongated body 44 by a first angle and a second support flange (e.g., 56*b*) may be offset at a second, different angle. By including a pair of flanges 56*a*, 56*b* the bracket 10 may be capable of having a higher rigidity than a single flange. Similarly, a single flange 56 can provide more rigidity than a bracket that is free of flanges. By increasing the rigidity of the second section 18 of the bracket 10, the bracket 10 may more robustly support the door frame 18. In addition, the rigidity of the second section may assist in better defining the bend region 62 along the second section.

Figure 8:
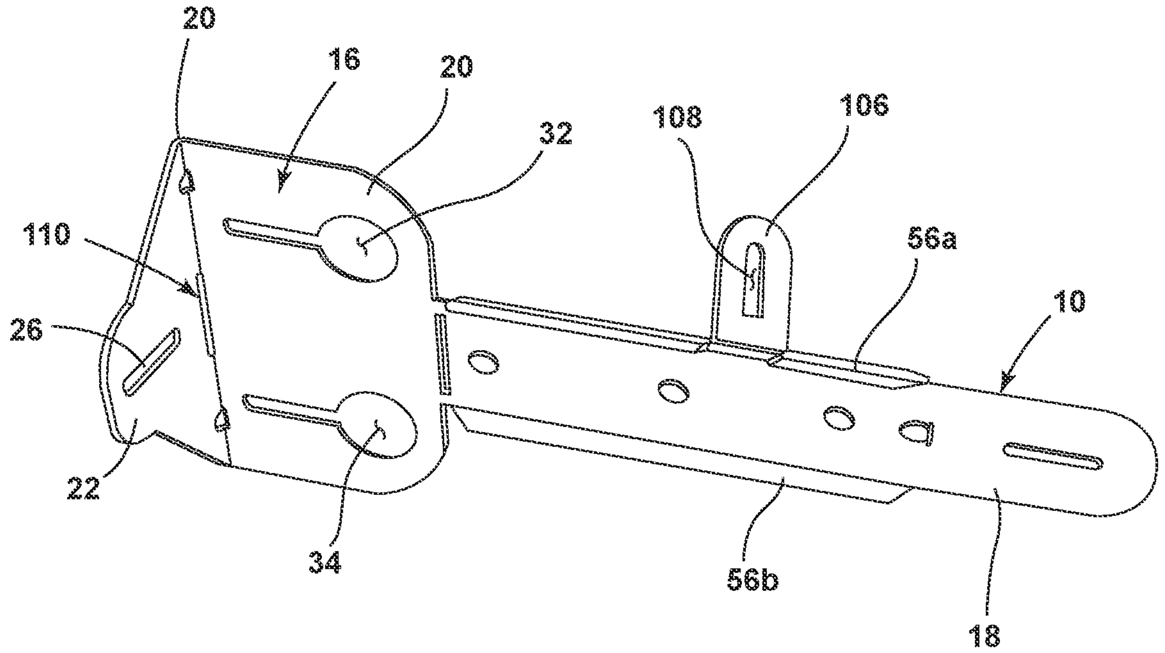
FIG. 8 is a top isometric view of the bracket of FIG. 7 having a tab extending from the second section, according to some examples.

In some embodiments, the mounting hardware assembly provided herein may be used with exterior doors. Once installed, the exterior doors may need to withstand extreme weather, such as storms, hurricanes, tornados, etc. For this, and other reasons, the bracket 10 may further include a tab 106 that extends from the elongated body 44 of the second section 18. In installations in which the second section 18 of the bracket 10 is separated from the first section 16 and initially attached to the door frame 12, the tab 106 may extend through a void in the first section 16 and bent in an offset direction from the second section 18 to further secure the bracket 10 to the door frame 12. For example, as illustrated in FIGS. 8 and 9, the tab 106 extends perpendicularly from the elongated body 44. In some embodiments, such as the example illustrated in FIG. 8, the tab 106 may separate a support flange 56 into first and second portions. The first and second portions may be of common or varied length.

In some examples, the tab 106 defines a slot 108 that also extends in a substantially perpendicular direction relative to the elongated body 44. However, the tab 106 may include any number of openings configured in any geometry.

Figure 9A:
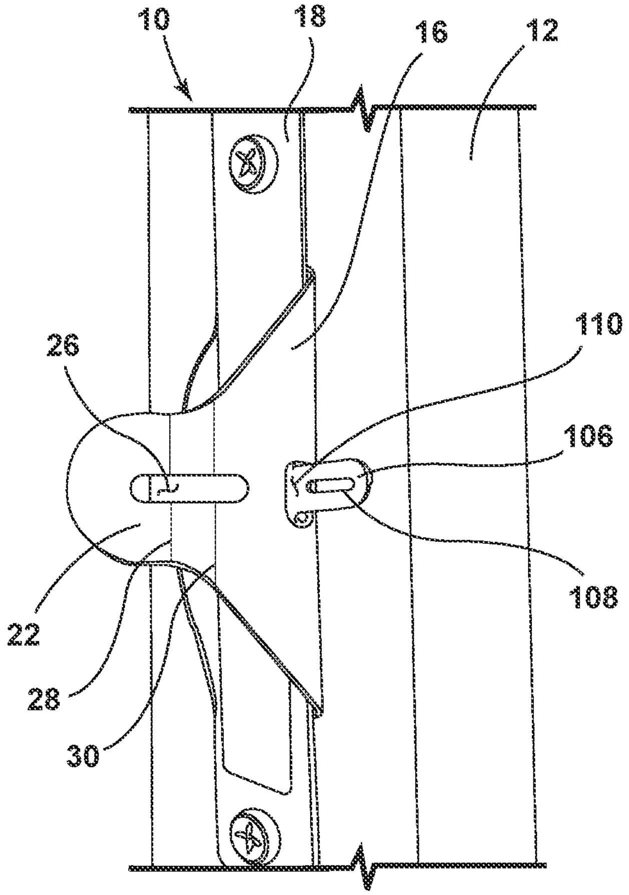
FIG. 9A is a side isometric view of the bracket of FIG. 7 having the tab of the second section positioned through a tab void of the first section, according to some examples.
Figure 9B:
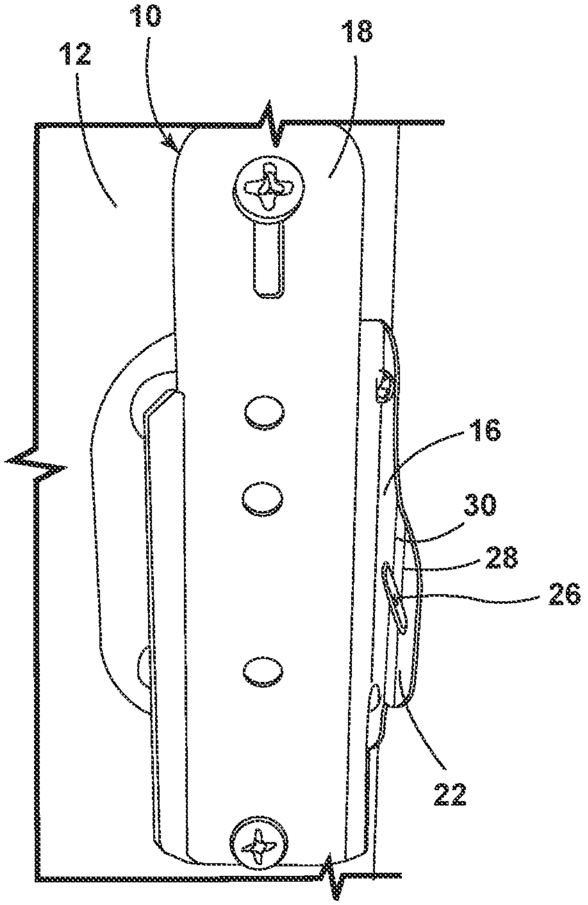
FIG. 9B is a top isometric view of the bracket of FIG. 7 having the tab of the second section positioned through a tab void of the first section, according to some examples.

In operation, the second section 18 of the bracket 10 may be attached to a door frame 12, as illustrated in FIGS. 9A and 9B. Next, the jamb portion 20 of the bracket 10 may be inserted between the second section 18 of the bracket 10 and the door frame 12 with the tab 106 positioned through a tab void 110 defined by the first section 16 of the bracket 10. Once positioned through the tab void 110, the tab 106 is bent towards the wall flange 22 of the first section 16, thereby aligning at least a portion of the tab void 110 with the fastener void 26 of the wall flange 22. A fastener 100 may then be positioned through the tab void 110 and the fastener void 26 defined by the wall flange 22. In some circumstances, by positioning the fastener through the slot of the tab and the fastener void of the wall flange, support between the pre-hung door assembly and the surrounding structure can be increased. The increase in support, or rigidity, may be advantageous in a variety of environments, such as inclement weather, high use environments, to provide additional security and so on. In some instances, the bracket 10, having the tab 106, may be used without the wall flange 22. In such circumstances, the various positioning features described herein may be used for alignment of the bracket 10 in a predefined position along a door frame 12.

In some embodiments, the positioning stops of the bracket may be punched or otherwise formed from any portion of the bracket. Once the positioning stops, and/or any other features, are formed, various other manufacturing processes may be used to create the bracket provided herein. For instance, in some examples, such as the embodiments illustrated in FIGS. 10-14, the positioning stops 102 are formed with the jamb flange 20 on an initial forming step (e.g., a punch step by a die). Once the jamb flange 20 and positioning stops 102 are formed, the attachment flange 22 can be formed on the next step of the manufacturing process (e.g., a bending step) to create a single plane of the wall attachment flange 22, without having to complete an additional opposing bend. By eliminating an additional bend during manufacturing, the time and cost of manufacturing the bracket 10 disclosed herein can be reduced.

Figure 10:
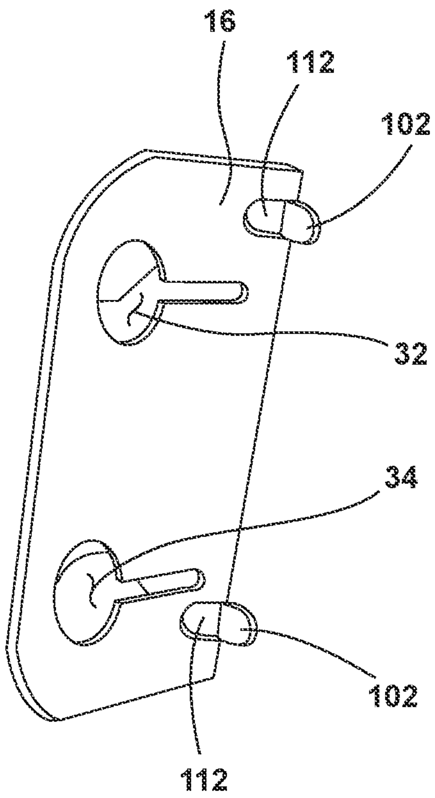
FIG. 10 is a bottom isometric view of the bracket having a pair positioning stops extending from the first section of the bracket and a pair of cavities defined by the first section of the bracket, according to some examples.
Figure 11:
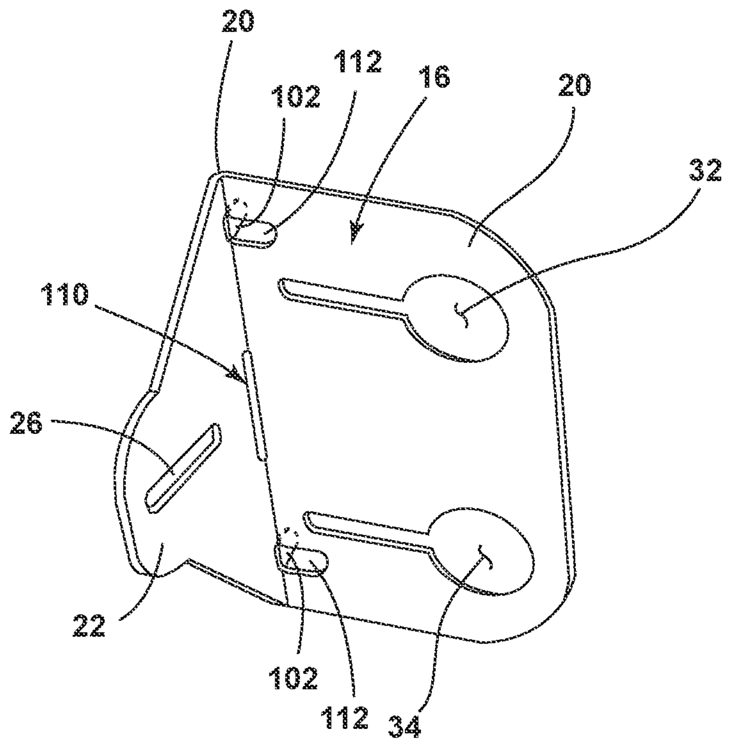
FIG. 11 is a top isometric view of the bracket of FIG. 10 defining the pair of cavities on a door jamb portion of the bracket, according to some examples.
Figure 12:
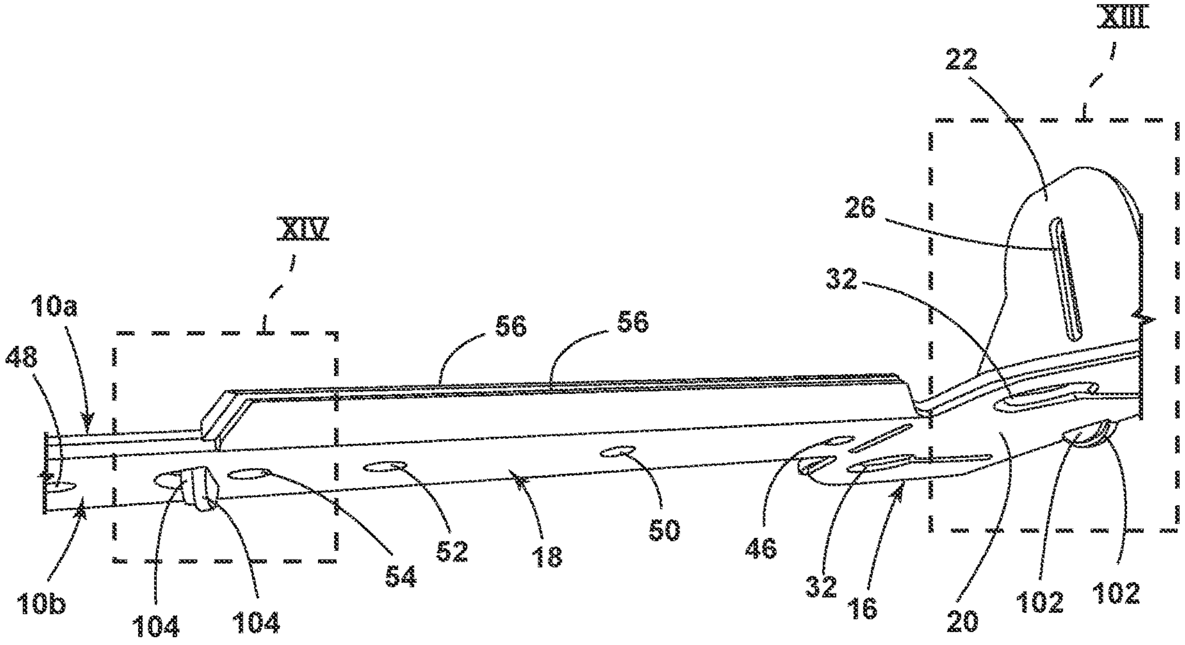
FIG. 12 is a side perspective view of a plurality of brackets with the positioning stops of a first bracket positioned through the cavities of a second bracket, according to some examples.
Figure 13:
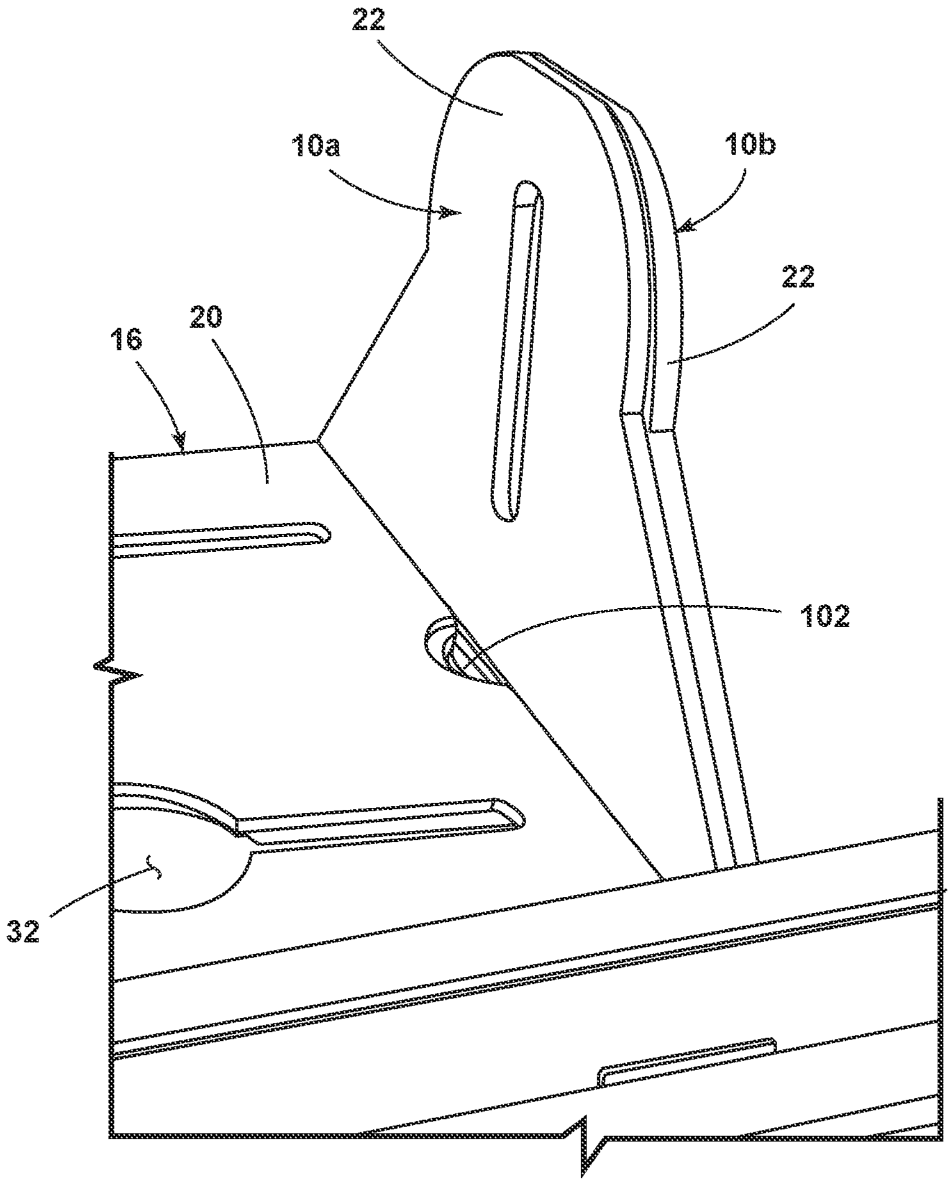
FIG. 13 is an enhanced view of section XIII of FIG. 12.
Figure 14:
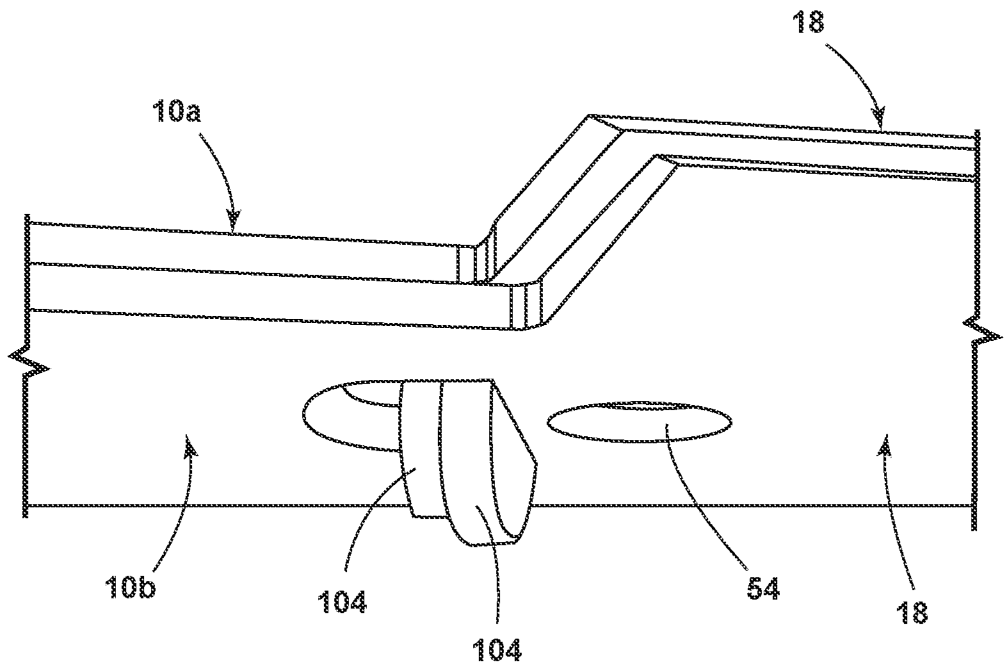
FIG. 14 is an enhanced view of section XIV of FIG. 12.

In some embodiments, such as those illustrated in FIGS. 10-14, the positioning stops 102 may be formed in a portion of the bracket 10 that allows for the positioning stops 102 of a first bracket 10*a* to be positioned through a cavity 112 formed by the positioning stops 102 of a second bracket 10*b*, which may allow for the brackets 10*a*, 10*b* may be oriented in a double layer configuration, as generally illustrated in FIGS. 12-14, for additional strength. In addition, in some embodiments, the double layer configuration may allow for efficient packaging of multiple brackets 10*a*, 10*b* among other potential benefits.

In examples in which the cavity 112 is defined by the jamb flange 20, the cavities 112 may be offset from the pair of apertures 32, 34 that are also defined by the jamb flange 20. In some instances, the pair of apertures 32, 34 are positioned between the pair of cavities 112 also defined by the jamb flange 20. In various examples, the positioning stops 102 may be of any shape. For example, in some instances, the position stops 102 may be generally semi-circular. In other instances, the stops 102 may be any other practicable shape.

In various embodiments, the bracket may include any number of positioning stops. For example, as illustrated in FIGS. 10 and 11, the bracket 10 may include a pair of positioning stops 102. Alternatively, as illustrated in FIGS. 12-14, the brackets 10*a*, 10*b* may include a single positioning stop 102. In embodiments including a single positioning stop 102, the positioning stop 102 may be generally centered along the common edge 24 of the bracket 10*a*, 10*b*, or in any other position along the common edge 24 of the bracket 10*a*, 10*b*. It will be appreciated that the bracket may be free of positioning stops or include more than two positioning stops in other embodiments without departing from the scope of the present disclosure.

As provided herein, in various embodiments, the mounting hardware assembly may include a bracket that defines a plurality of fastener openings. For example, in the embodiments illustrated in FIGS. 15 and 16, the bracket 10 of the mounting hardware assembly can define a jamb flange 20 and a wall flange 22. Each of the jamb flange 20 and the wall flange 22 can be configured to extend outwardly of a door frame 12.

The bracket 10 further defines a plurality of fastener openings 114, 116, 118 defined by the bracket 10 and positioned along a common axis a. In some instances, the plurality of fastener openings 114, 116, 118 can include a generally centrally-located opening 114. In some instances, the plurality of fastener openings can also include a first lateral fastener opening 116 positioned between the centrally-located fastener opening 114 at the jamb flange 20 and a second lateral fastener opening 118 positioned between the centrally-located opening 114 and the wall flange 22.

As provided herein, the bracket 10 can further include a first retaining projection 104*a* can extend perpendicularly to the common axis a and can be positioned between the first lateral opening 116 and a slot 48 of the jamb flange 20. A second retaining projection 104*b* can extend perpendicularly to the common axis a and can be positioned between the second lateral fastener opening 118 and a slot 48 on the wall flange 22.

Figure 15:
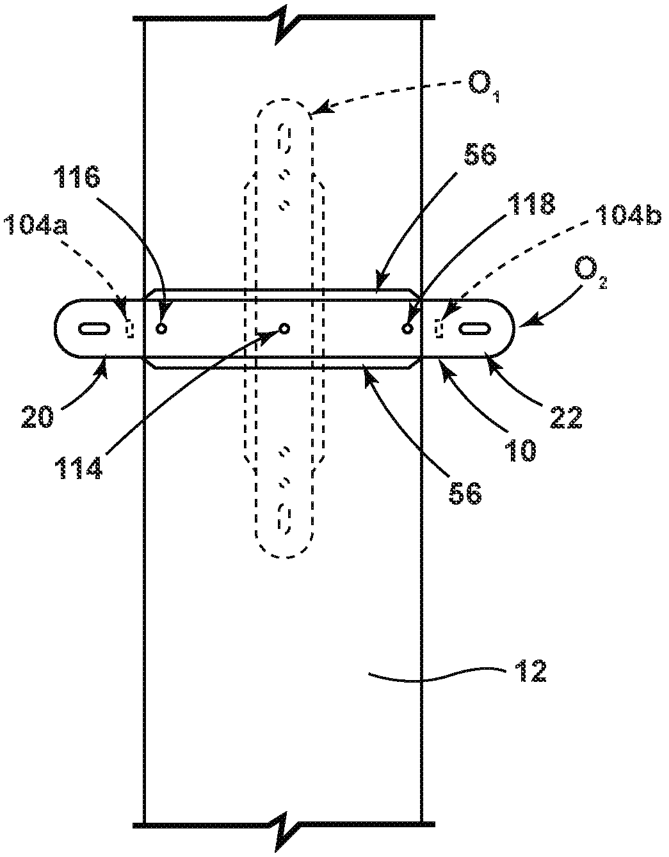
FIG. 15 is a front isometric view of a mounting assembly coupled to a pre-hung door assembly, according to some examples.
Figure 16:
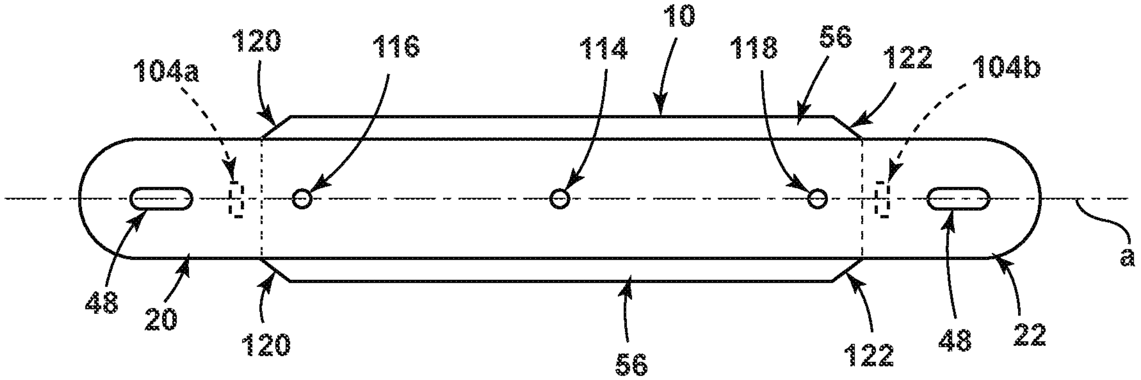
FIG. 16 is a top isometric view of a bracket of a mounting hardware assembly of FIG. 15, according to some examples.

With further reference to FIGS. 15 and 16, the support flange 56 can extend at least partially along the bracket 10. For example, in the embodiments illustrated in FIGS. 15 and 16, the bracket 10 may include a pair of support flanges 56 that extend along opposing edges of the bracket 10. In some instances, one or both of the support flanges 56 can include a first end portion 120 that terminates between the first lateral opening 116 and the jamb flange 20, and a second end portion 122 of the support flange 56 terminates between the second lateral fastener opening 118 and the wall flange 22.

In operation, in some embodiments, the bracket 10 may be installed on the door frame 12 during assembly of the pre-hung door assembly 70. For instance, a fastener may be positioned through the generally centrally-located fastener opening 114 and the bracket 10 may be placed in a first orientation $O_1$ such that the jamb flange 20 and the wall flange 22 are positioned laterally inward of the edges of the door frame 12. During the installation of the pre-hung door assembly 70, the bracket 10 may be rotated to a second orientation position $O_2$. In the second orientation position $O_2$, the jamb flange 20 and the wall flange 22 may extend outwardly of the door frame 12. In addition, the first and second retaining projections 104*a*, 104*b* may be positioned in close proximate and/or outward of opposing edges of the door frame 12. As such, in some embodiments, the first and second retaining projections 104*a*, 104*b* may be separated by a predefined distance that is generally equal to the width of the door frame 12. For instance, in some implementations, the first and second retaining projections 104*a*, 104*b* may be separated by 4.3125 inches or any other distance. Once the bracket 10 is rotated to the second orientation position $O_2$, a fastener may be respectively positioned through the first and second lateral fastener openings 116, 118 to retain the bracket 10 in place. Next, the jamb flange 20 and the wall flange 22 may be bent and an additional retainer may be positioned through the respective slots 48 of the jamb flange 20 and the wall flange 22.

Figure 17:
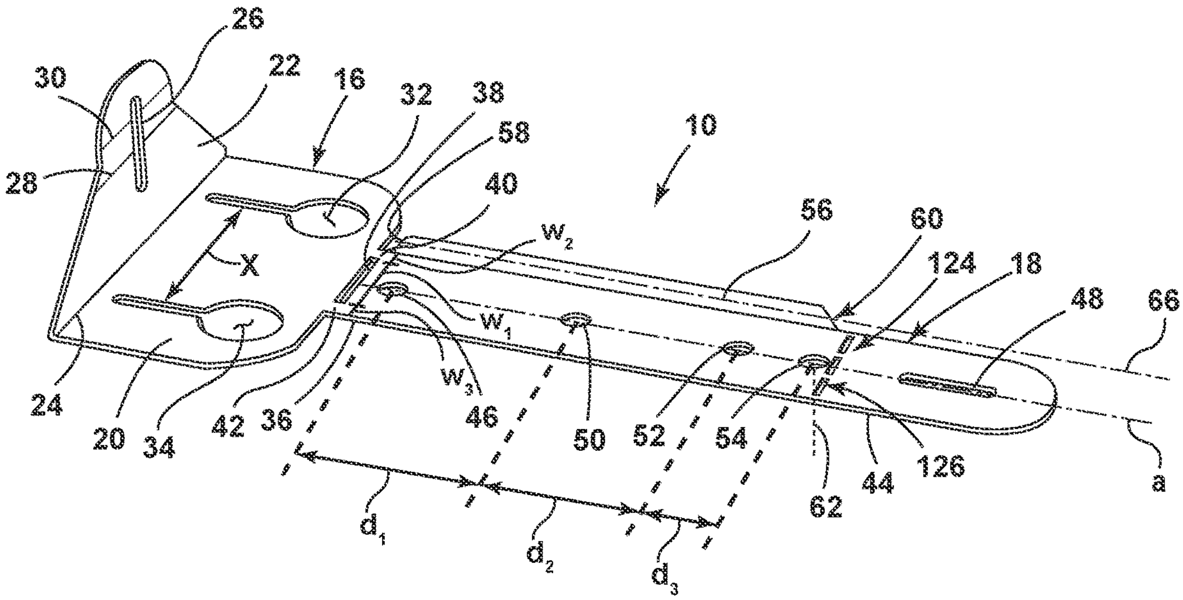
FIG. 17 is a top isometric view of a bracket of a mounting hardware assembly, according to some examples.
Figure 18:
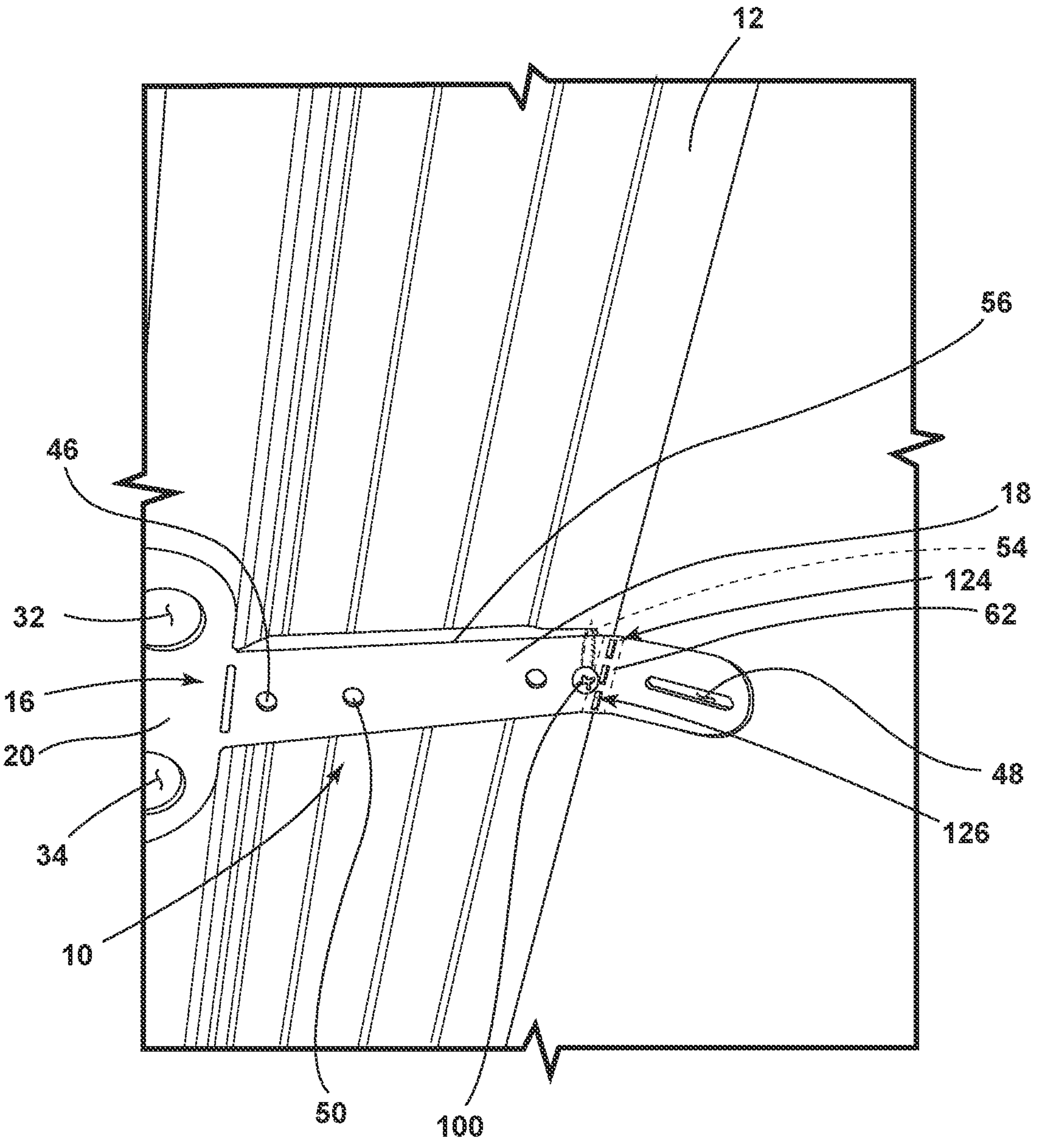
FIG. 18 is a front isometric view of the bracket of FIG. 17 having first and second sections attached to one another and coupled to a door jamb of the pre-hung door assembly, according to some examples.

Referring now to FIGS. 17 and 18, in some examples, the first end portion 58 of the support flange 56 terminates proximately to the attachment legs 40, 42. Additionally, the second end portion 60 of the support flange 56 may terminate proximate to a bend region 62 of the second section 18. As illustrated, the bend region can include define a weakened region with the weakened region defining a living hinge, a score line, perforations, or any other feature, such that the weakened region allows for the facilitation of the bending or breaking (when splitting the brackets into two pieces).

For example, as illustrated in FIGS. 17 and 18, a weakened region 124 defines one or more notches 126 that is positioned between the weakened portion 36 of the bracket 10 and the slot 48 of the second section 18 of the bracket 10. In some installation processes, the weakened region 124 may be configured to retain contact between the slot 48 and the remaining one or more openings 46, 48, 50, 52, 54 while allowing deformation therebetween. In some embodiments, the weakened region 124 may intersect one or more openings 46, 48, 50, 52, 54 defined by the elongate body 44. It will be appreciate that the notches 126 may be of any number and/or any geometric shape without departing from the teachings provided herein.

Use of the present disclosure may offer a variety of advantages, which is provided by various combinations of the features provided herein. For instance, the mounting hardware assembly may include a bracket for hanging a door through various installation processes. The bracket may include first and second sections that are separable from one another. In some installation processes, the first and second sections may be maintained as a single integral component. In some installation processes, the first section of the bracket may be separated from the second section of the bracket. Once separated the second section may be coupled to the door jamb and the first section may be inserted between the second section and a door jamb. Moreover, the second section may include a tab extending therefrom that is inserted through the first section to add further support to the bracket. In addition, in some installation processes, the first and second sections of the bracket may be separated from each other with each respective first and second section operably coupled with the door jamb and a surrounding structure on opposing sides of the door jamb. Moreover, the first and second sections may be installed in vertically offset positions relative to one another. The mounting hardware assembly provided herein may be manufactured at lower costs compared to other brackets that are only capable of a single installation process.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

It is also important to note that the construction and arrangement of the elements of the invention as shown in the examples are illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting. In addition, variations and modifications can be made on the aforementioned structures and methods without departing from the concepts of the present invention and such concepts are intended to be covered by the following claims unless these claims by their language expressly state otherwise.

What is claimed is:

1. A mounting hardware assembly, comprising:

a bracket having first and second sections coupled to one another by a weakened portion;

a jamb flange and a wall flange each defined by the first section, the wall flange extending perpendicularly from the jamb flange at a common edge;

first and second flange apertures defined by the jamb flange;

an elongated body defined by the second section; and a plurality of openings defined by the elongated body, the plurality of openings including first and second openings, wherein a first distance between the first and second openings is equal to a second distance between the first and second flange apertures.

2. The mounting hardware assembly of claim 1, wherein the wall flange defines a fastener void that is substantially centrally disposed within the wall flange.

3. The mounting hardware assembly of claim 1, further comprising:

a positioning stop extending from the first section; and a retaining projection extending from the second section of the bracket, wherein the positioning stop extends perpendicularly to the jamb flange and the retaining projection extends perpendicularly to the elongated body.

4. The mounting hardware assembly of claim 1, further comprising:

a tab extending perpendicularly from the elongated body of the second section, wherein the tab defines a fastener slot.

5. The mounting hardware assembly of claim 4, wherein the tab separates a support flange into first and second portions.

6. The mounting hardware assembly of claim 4, further comprising:

a tab void defined by the first section of the bracket, wherein the tab is shaped to be inserted through the tab void.

7. The mounting hardware assembly of claim 1, further comprising:

a support flange extending at least partially along the elongated body, the support flange offset from the elongated body, wherein the support flange terminates proximately to the weakened portion.

8. The mounting hardware assembly of claim 1, further comprising:

a support flange extending at least partially along the elongated body, the support flange offset from the elongated body, wherein the support flange terminates proximate a bend region of the elongated body.

9. The mounting hardware assembly of claim 8, wherein at least one of the plurality of openings defined by the elongated body of the second section is disposed on the bend region of the elongated body.

10. The mounting hardware assembly of claim 1, wherein the first section of the bracket is non-identical to the second section of the bracket.

11. A mounting hardware assembly, comprising:

a bracket having first and second sections;

a jamb flange and a wall flange each defined by the first section;

first and second flange apertures defined by the jamb flange;

a positioning stop extending perpendicularly from the jamb flange and positioned between the first and second flange apertures;

an elongated body defined by the second section;

a notch defined between the first and second sections, and a pair of attachment legs extending between the first and second sections on opposing sides of the notch.

12. The mounting hardware assembly of claim 11, further comprising:

a retaining projection extending perpendicularly from the second section of the bracket and in a substantially parallel direction relative to the positioning stop.

13. The mounting hardware assembly of claim 11, further comprising:

a plurality of openings defined by the elongated body, the plurality openings including first and second openings, wherein the first opening and the first flange aperture at least partially align when the second opening and the second flange aperture are at least partially aligned.

14. The mounting hardware assembly of claim 11, further comprising:

a tab extending perpendicularly from the elongated body of the second section, wherein the tab defines a fastener slot.

15. The mounting hardware assembly of claim 14, further comprising:

a tab void defined by the first section of the bracket, wherein the tab is shaped to be inserted through the tab void.

16. The mounting hardware assembly of claim 11, further comprising:

a support flange extending at least partially along the elongated body.

17. A mounting hardware assembly, comprising:

a bracket having first and second sections;

a plurality of fastener openings defined by the second section and positioned along a common axis, the plurality of fastener openings including a generally centrally-located opening;

first and second attachment legs extending between the first and second sections; and a notch defined by the first section, the second section, the first attachment leg, and the second attachment leg, wherein the notch has a first width that is greater than a second width of the first attachment leg or a third width of the second attachment leg.

18. The mounting hardware assembly of claim 17, further comprising:

first and second flange apertures defined by the first section, wherein the plurality of openings including first and second openings, wherein a first distance between the first and second openings is equal to a second distance between the first and second flange apertures.

19. The mounting hardware assembly of claim 18, wherein the first and second flange apertures are separated from one another by fourth width, and wherein the fourth width is less than the first width.

20. The mounting hardware assembly of claim 18, further comprising:

a first retaining projection extending perpendicularly to the common axis and positioned on the first section; and a second retaining projection extending perpendicularly to the common axis and positioned on the second section.

* * * * *